United States Patent
Spencer

(10) Patent No.: US 6,637,489 B1
(45) Date of Patent: Oct. 28, 2003

(54) WAFER FOR USE IN THE SELECTIVE CONNECTING AND DISCONNECTING OF PLASTIC TUBES

(75) Inventor: Dudley W. C. Spencer, Wilmington, DE (US)

(73) Assignee: Denco, Inc., Wilmington, DE (US)

(*) Notice: Subject to any disclaimer, the term of this patent is extended or adjusted under 35 U.S.C. 154(b) by 0 days.

(21) Appl. No.: 10/264,447

(22) Filed: Oct. 4, 2002

(51) Int. Cl.[7] .............................................. B29C 65/18
(52) U.S. Cl. .................... 156/503; 156/158; 156/304.2; 156/304.6; 156/499
(58) Field of Search ............................. 156/158, 304.2, 156/304.5, 304.6, 499, 503, 507, 508, 515, 518, 530, 535

(56) References Cited

U.S. PATENT DOCUMENTS

| 5,279,685 A | * | 1/1994 | Ivansons et al. ............ 156/158 |
| 5,525,186 A | * | 6/1996 | Ivansons et al. ............ 156/503 |
| 5,855,731 A | * | 1/1999 | Spencer ....................... 156/503 |
| 5,871,612 A | * | 2/1999 | Spencer ....................... 156/503 |
| 6,132,833 A | * | 10/2000 | Spencer ..................... 428/64.1 |

* cited by examiner

Primary Examiner—James Sells
(74) Attorney, Agent, or Firm—Connolly Bove Lodge & Hutz LLP

(57) ABSTRACT

A wafer for use in selectively connecting and disconnecting plastic tubes is in the form of a heatable plate having side walls and having a leading end and a trailing end. An outwardly extending scoop is formed on each of the side walls between and spaced from the leading end and the trailing end. A pair of slits is formed in the trailing end in line with the scoops for reducing the amount of plastic material remaining on the wafer.

20 Claims, 1 Drawing Sheet

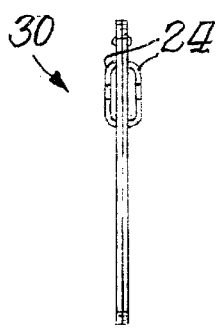
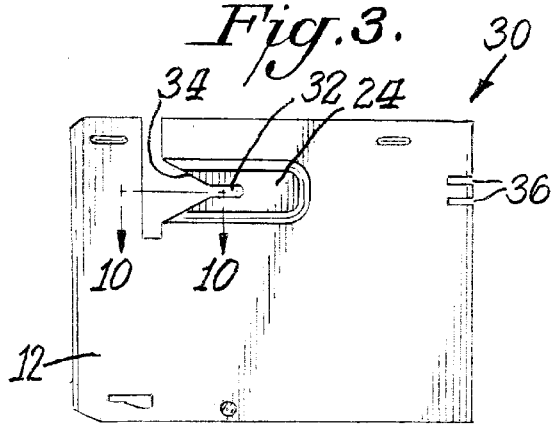
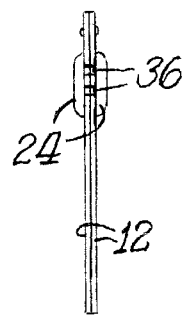
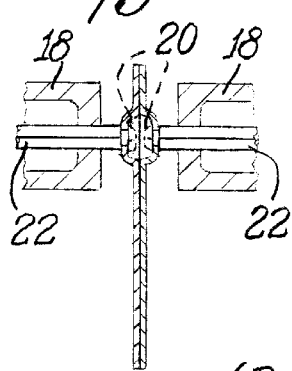
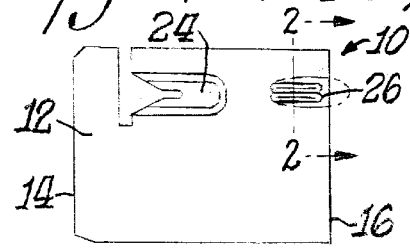
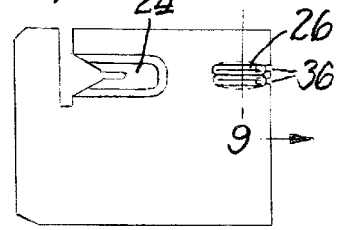
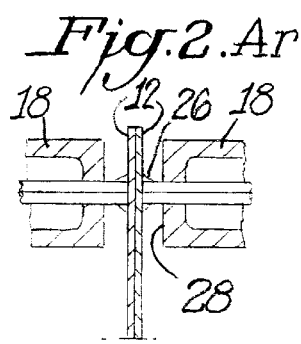
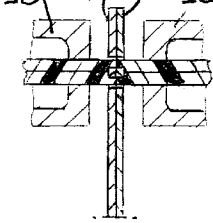

WAFER FOR USE IN THE SELECTIVE CONNECTING AND DISCONNECTING OF PLASTIC TUBES

BACKGROUND OF THE INVENTION

The present invention is directed to the total containment welding of plastic tubes. Various prior art exists disclosing different approaches to welding plastic tubes together and to the cutting of a plastic tube for separation into two tube segments. A general approach when welding two plastic tubes together is to clamp each tube in a tube holder with a portion of the tube extending outwardly of its holder. Each tube may be, for example, bent so that the bent ends of the two tubes are disposed toward each other. A heated wafer then passes through the bent ends of the two tubes to melt the bent ends and remove the bent portions. After the wafer is moved downstream away from the tubes, the tubes are pressed into contact with each other so that the melted tubes are welded together. This results in two main portions of the tubes being in communication with each other to form a unitary welded tube. In addition, the free ends or stubs of the bent tubes are also welded together and may be discarded or used for purposes of collecting samples, etc.

One known form of wafer is a metal plate which is folded upon itself to create a pair of sides. When the wafer is heated the lead end of the wafer begins to melt the plastic tubes as the wafer begins to pass through the spacing where the tubes extend from their holders. The melted plastic material is then deposited on the sides of the wafer. An advantageous form of this wafer is to include a scoop on each of the side walls so that the scoop collects the melted material at the bent ends when the wafer passes through the spacing between the holders.

SUMMARY OF THE INVENTION

An object of this invention is to provide a heatable wafer which includes structure for assuring an effective weld of the melted tube sections.

A further object of this invention is to provide such a wafer which increases the resulting weld strength of the welded tubes.

In accordance with this invention the wafer is in the form of a heatable plate having opposed side walls and a leading end and a trailing end. An outwardly extending scoop is formed on each of the side walls between and spaced from the leading end and the trailing end. Each scoop is open toward the leading end to remove a portion of the material of the plastic tubes as the heated wafer is moved between and in contact with the exposed portions of the tubes. In accordance with this invention a plurality of, and preferably two, slits are formed in the trailing end of the wafer in line with the scoops for minimizing the amount of plastic material that would remain on the wafer when the wafer is removed from the weld area.

The slits are of sufficient length to permit the melted plastic to be easily removed from the moving wafer and remain available as a weld pool when the melted ends of the tubes are pressed into contact with each other. A preferred length of the slits is 2 mm.

The invention may be practiced where the scoops have a leading surface that is tapered inwardly to facilitate the plastic material being collected into the scoops.

THE DRAWINGS

FIG. 1 is a side elevational view of a prior art wafer;

FIG. 2 is a cross-sectional view taken through FIG. 1 along the line 2—2;

FIG. 3 is a side elevational view of a wafer formed in accordance with this invention;

FIG. 4 is a top plan view of the wafer shown in FIG. 3;

FIG. 5 is a front elevational view of the wafer shown in FIGS. 3–4;

FIG. 6 is a rear elevational view of the wafer shown in FIGS. 3–5;

FIG. 7 is a side elevational view similar to FIG. 1, but of the wafer shown in FIGS. 3–6;

FIG. 8 is a cross-sectional view showing the wafer of FIGS. 3–7 when the scoops contact the plastic tubes;

FIG. 9 is a cross-sectional view taken through FIG. 7 along the line 9—9; and

FIG. 10 is a cross-sectional view taken through FIG. 3 along the line 10—10.

DETAILED DESCRIPTION

FIG. 1 illustrates one form of generally known wafer 10. As shown therein wafer 10 is made from a flat plate of heat conductive material, such as copper bent upon itself (see FIG. 4) so as to result in a pair of side walls 12. Wafer 10 also includes a leading end 14 and a trailing end 16. Wafer 10 could be used in a total containment device such as disclosed in U.S. Pat. No. 5,279,685, all of the details of which are incorporated herein by reference thereto. The device would include a pair of tube holders 18,18 (see FIGS. 2 and 8). Each tube holder would have a tube receiving area in which a plastic tube which could be bent upon itself (see FIG. 8) would be inserted and clamped. The tube holders 18,18 are capable of moving toward and away from each other. As shown in FIG. 8 the bent ends 20,20 of the tubes 22,22 would be disposed very close to each other. Tubes 22 are made of conventional medical plastic material, such as PVC. Wafer 10 would be heated in the total containment device and then would be moved into the spacing between the tube holders 18,18 to contact the tube ends 20,20. Contact by the heated wafer would cause the tube ends 20,20 to melt.

As shown in FIG. 1 a scoop 24 is provided on the side wall 12 of wafer 10. A mirror image scoop would be provided on the opposite side wall of wafer 10. If desired, the wafer could also be provided with wings such as illustrated in U.S. Pat. No. 5,525,186, all of the details of which are incorporated herein by reference thereto. The melted plastic material resulting from the bent ends 20,20 of tubes 22,22 being heated and placed in a molten condition by wafer 10 would result in the scoops 24 collecting the melted material. As the wafer continues to move through the spacing between tube holders 18,18 the tube holders would be moved toward each other to maintain contact of the melted ends of tubes 22,22 with wafer 10. In the conventional type wafer where trailing end 16 has a straight uninterrupted edge some of the molten material 26 collects on the walls 12. As a result, when the wafer 10 is moved completely out of contact with the molten ends of tubes 22,22 the collected material 26 is no longer available for use in welding the remaining tube sections of tubes 22,22 together. Thus, when the wafer scoops the bent tube ends 20,20 the amount of tube material left on the exposed portions of the melted tubes 22,22 is used for making the weld by use of the melt pool principal. The exposed portion each tube occupies is the distance between the wafer sides 12 and the ends 28 of the tube holder clamps. See FIG. 2. The clamps of the holders 18,18 function to control the spacing of the tubes from each other. The clamps initially move forward to press the scooped tubes against the hot wafer 10 in preparation to make a weld with the molten plastic tube material. As the wafer again moves forward or downstream some of the molten plastic 26 adheres to the wafer while it is still effecting a melt pool of hot plastic as a pathogen barrier. FIG. 1 shows in phantom the extent of the material 26 being dragged by wafer 10. This material tends to leave the wafer exit area deprived of tubing material thereby making one side of the tube stronger than the other, due to the lack of depleted material 26 remaining on the wafer sides 12.

The present invention provides structure to make a uniformly strong weld from the molten material after securing its function as a pathogen barrier. FIGS. 3–10 illustrate a modified wafer 30 in accordance with this invention. Like reference numerals are used in FIGS. 3–10 for like parts with regard to the known wafer 10 shown in FIGS. 1–2. Thus, the wafer 30 also includes a pair of mirror image scoops 24,24 which may further include slits or slots 32 extending inwardly from the lead edge 34 of each scoop.

In accordance with this invention a slit 36 and preferably a pair of generally horizontal slits 36,36 is provided in each side 12 in the trailing end 16 of wafer 30. The slits in each of the sides are aligned with the slits in the other to form two sets of vertically spaced slits. U.S. Pat. No. 5,525,186 discloses a wafer which includes a single slit preferably having a length of 7 mm and a width of 0.5 mm. As stated in that patent the slit is intended to permit the molten material from the tubes to begin contacting each other at an earlier time while the tubes are still in the area of the wafer. No disclosure is made in the patent of use with bent tubes. Instead the tubes are straight which are in the flattened condition when contacted by the wafer. In practice the 7 mm length would correspond to at least the thickness of the flattened straight tube. In contrast the present invention is preferably used with bent tubes. The length of slits 36 would cover only about 30% of the thickness of the clamped bent tubes. The front or upstream portion of the weld would have a sufficiently strong weld. The slits 36 are intended to deposit just enough material at the end of the cut to strengthen that part of the weld. Thus, shorter length slits 36 can be used than the length of the single slit in U.S. Pat. No. 5,525,186.

In accordance with this invention the pair of slits 36,36 is intended to provide during the melt cycle sufficient plastic material to be able to not only maintain a pathogen seal, but also to permit a portion of the plastic material to flow into the slits 36,36 and make bonding contact with the tubes. When the wafer 30 is advanced, the plastic material in the slits 36,36 stay with the molten tubes thus making a stronger weld at 80–90% of the raw tubing strength. The invention thus could result in a wet-to-wet weld strength that can be increased by approximately 15–20% simply by making the noted changes.

While U.S. Pat. No. 5,525,186 discloses a single slit having a length which is preferably 7 mm, the slits 36,36 need only be long enough to permit the molten material 26 to make bonding contact with the remaining portions of the heated tubes 22,22. A preferred length of slits 36,36 is 5 mm or less and most preferably 2 mm. Each slit 36,36 may be about 0.5 mm. The distance from the outer edge of one slit 36 to the outer edge of the other edge 36 is preferably about 1.75 mm.

Thus, in accordance with the practice of this invention instead of having molten material 26 remaining on the sides 12,12 of the wafer, the sides 12,12 are virtually free of such molten material in the practice of this invention as shown in FIGS. 7–8.

FIG. 10 illustrates a further aspect of this invention wherein the lead edges 38,38 of the scoops 24,24 are tapered to form a knife edge. The taper is in a direction toward the interior of each scoop to facilitate the molten plastic material entering the scoop interior. Generally, the thickness of the scoop wall would be 0.001 inches wide. With scoops formed in accordance with U.S. Pat. No. 5,525,186 where there is no taper on the lead edge, a blunt face is presented against the plastic tubes. Since the plastic tubes are initially cold the blunt lead edge does not necessarily direct the plastic material to completely flow into the scoops. By making a tapered knife edge 38 the material would be pushed into the scoops to improve the function of the scoops. Such tapered edge may be provided completely along the lead edge of the scoops including being into the slots 32.

Although the invention is preferably practiced with a set of two slits 36,36, in its broad application the invention could include more than two slits as the plurality of slits exposed from the trailing edge of the wafer. Although not as preferred the invention could also be practiced with a single slit. In such practice of the invention the single slit need only be long enough to permit the plastic material on the side walls of the wafer to flow into the slit and make bonding contact with the tubes and thereby remain contacting the tubes after the wafer has been removed from the location of the clamps in the tube holder.

The tube welding operation would proceed as in a conventional manner by the clamps in the holders 18,18 moving the molten tube ends into contact with each other. Where a bent tube 22 is used, the resulting welding operation would create two sets of welded tubes which are formed from the aligned portions of the bent tubes shown, for example, in FIG. 9. One set of welded tube sections would generally comprise a main tube which could be used, for example, in dialysis to connect a new bag having its tube to a tube leading to the patient. The bent ends or stubs from the used bag tube and from the patient would also be connected together and could be discarded or used as a sample tubing.

What is claimed is:

1. A wafer for use in a device for selectively connecting and disconnecting plastic tubes, said wafer being in the form of a heatable plate having opposed side walls and having a leading end and a trailing end, an outwardly extending scoop formed on each of said side walls between and spaced from said leading end and said trailing end, each of said scoops being open toward said leading end to remove a portion of the material of the plastic tubes as the wafer is moved between and in contact with exposed portions of the plastic tubes, and a plurality of exposed slits formed in said trailing end in line with said scoops for reducing the amount of plastic material remaining on said wafer.

2. The wafer of claim 1 wherein said slits are generally horizontal and are parallel to each other.

3. The wafer of claim 2 wherein each of said slits has a length no greater than 5 mm.

4. The wafer of claim 3 wherein there are two sets of said slits, each of said slits having a width of about 0.5 mm, and the distance between the outer edge of one of said slits to the outer edge of the other of said slits being about 1.75 mm.

5. The wafer of claim 4 wherein plate is folded upon itself to form said sides, and said slits being formed in each of said sides.

6. The wafer of claim 4 wherein each of said scoops has a lead edge, and said lead edge being tapered to form a knife edge.

7. The wafer of claim 6 wherein said taper is in an inward direction toward the interior of said scoop.

8. The wafer of claim 7 wherein each of said scoops has a slot in its outer wall extending from said lead edge away from said open end of said scoop.

9. The wafer of claim 8 wherein each of said slots has a knife edge inward taper.

10. The wafer of claim 1 wherein each of said scoops has a lead edge, and said lead edge being tapered to form a knife edge.

11. The wafer of claim 10 wherein said taper is in an inward direction toward the interior of said scoop.

12. A wafer for use in a device for selectively connecting and disconnecting plastic tubes, said wafer being in the form of a heatable plate having opposed side walls and having a leading end and a trailing end, an outwardly extending scoop formed on each of said side walls between and spaced from said leading end and said trailing end, each of said scoops being open toward said leading end to remove a portion of the material of the plastic tubes as the wafer is moved between and in contact with exposed portions of the plastic tubes, at least one exposed wafer formed in said trailing end in line with said scoops for reducing the amount of plastic material remaining on said wafer, and said at least one slit having a length of no greater than 5 mm.

13. The wafer of claim 12 wherein said at least one slit has a length of about 2 mm.

14. The wafer of claim 13 wherein there are two sets of said slits, each of said slits having a width of about 0.5 mm and the distance between the outer edge of said slits to the outer edge of the other of said slits being about 1.75 mm.

15. The wafer of claim 14 wherein plate is folded upon itself to form said sides, and said slits being formed in each of said sides.

16. The wafer of claim 12 wherein there are two of said slits, each of said slits having a width of about 0.5 mm and the distance between the outer edge of said slits to the outer edge of the other of said slits being about 1.75 mm.

17. The wafer of claim 16 wherein plate is folded upon itself to form said sides, and said slits being formed in each of said sides.

18. The wafer of claim 12 wherein each of said scoops has a lead edge, and said lead edge being tapered to form a knife edge.

19. The wafer of claim 18 wherein said taper is in an inward direction toward the interior of said scoop.

20. The wafer of claim 19 wherein each of said scoops has a slot in its outer wall extending from said lead edge away from said open end of said scoop.

* * * * *